Sept. 22, 1964
H. W. PENMAN
3,150,023
METHOD AND APPARATUS FOR LAMINATING A LAYER OF PLASTIC
AND SCRIM ON THE BACKING OF CARPET
Filed Dec. 1, 1960
3 Sheets-Sheet 1
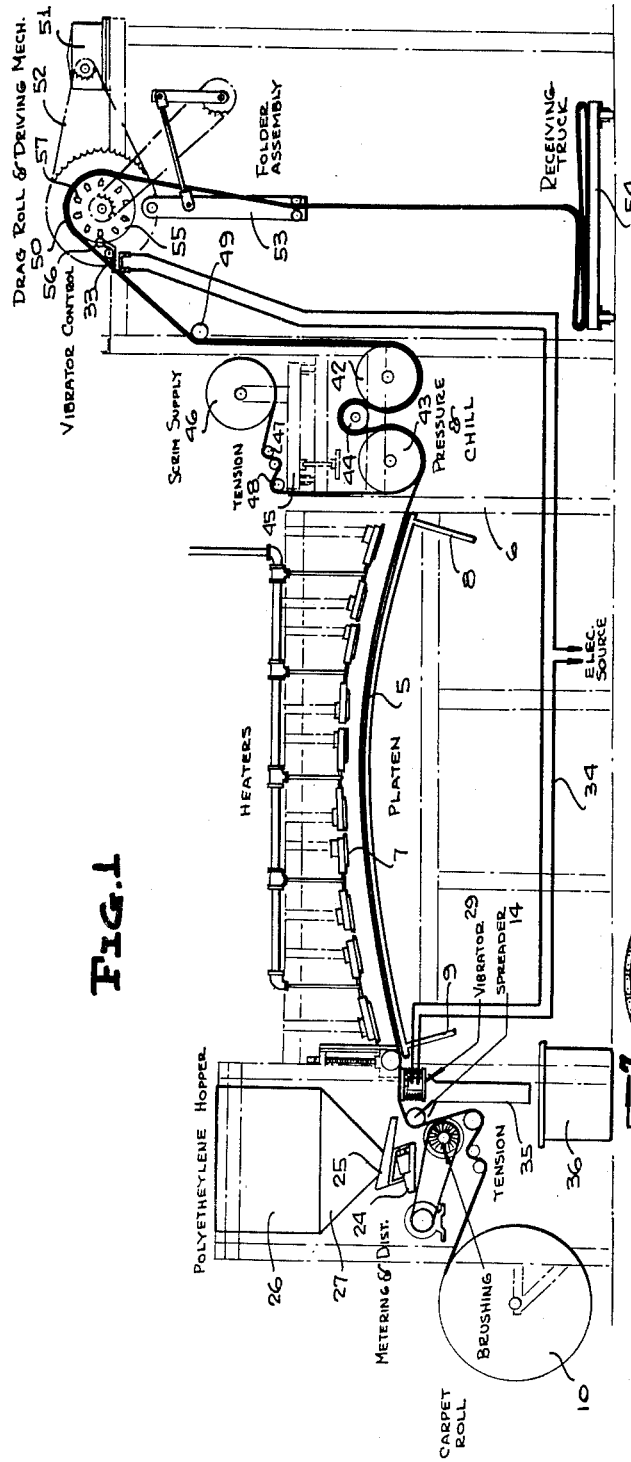
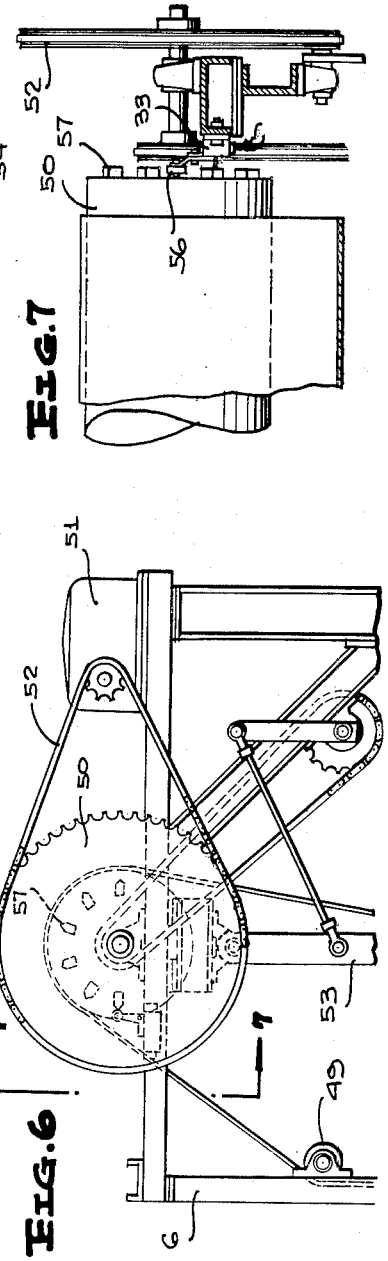
INVENTOR.
HURL W. PENMAN
BY Ralph Burch
ATTORNEY Sept. 22, 1964   H. W. PENMAN   3,150,023
METHOD AND APPARATUS FOR LAMINATING A LAYER OF PLASTIC
AND SCRIM ON THE BACKING OF CARPET
Filed Dec. 1, 1960   3 Sheets-Sheet 2
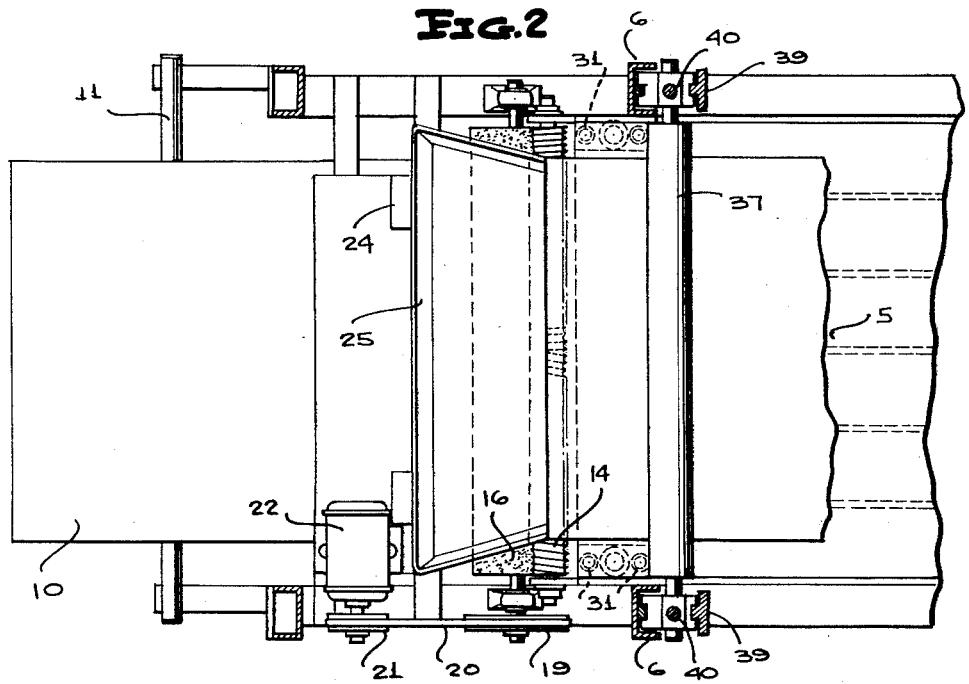
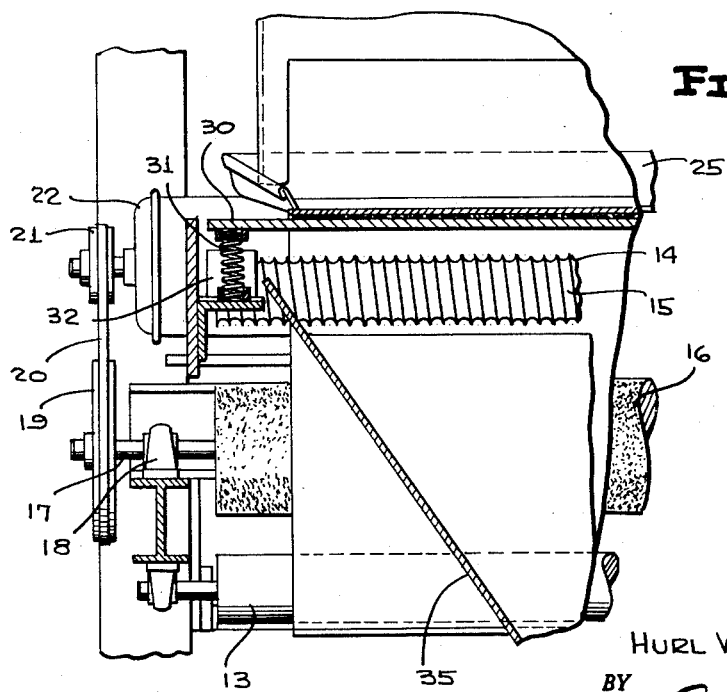
INVENTOR.
HURL W. PENMAN
BY Ralph Burch
ATTORNEY Sept. 22, 1964   H. W. PENMAN   3,150,023
METHOD AND APPARATUS FOR LAMINATING A LAYER OF PLASTIC
AND SCRIM ON THE BACKING OF CARPET
Filed Dec. 1, 1960   3 Sheets-Sheet 3

INVENTOR.
HURL W. PENMAN
BY
*Ralph Burch*
ATTORNEY

United States Patent Office 3,150,023
Patented Sept. 22, 1964

3,150,023
METHOD AND APPARATUS FOR LAMINATING A LAYER OF PLASTIC AND SCRIM ON THE BACKING OF CARPET
Hurl W. Penman, Bloomsburg, Pa., assignor to The Magee Carpet Company, Bloomsburg, Pa., a corporation of Pennsylvania
Filed Dec. 1, 1960, Ser. No. 80,717
4 Claims. (Cl. 156—73)

This invention relates to a method and apparatus for laminating a layer of thermoplastic material and a sheet of scrim on the backing of a carpet and more particularly to improvements in the method and apparatus disclosed in my prior application filed September 20, 1960, Serial No. 57,291.

It is an object of the invention to provide apparatus having a brushing element for removing excess fibers from the carpet backing prior to depositing the layer of thermoplastic powder on the backing.

A further object of the invention resides in providing apparatus having means for vibrating the carpet immediately after the thermoplastic powder is deposited on the backing whereby the powder is more evenly distributed over the backing and penetrates the interstices of the weave.

A still further object of the invention resides in providing means for intermittently controlling the operation of the vibrating means.

Other objects and advantages of the invention will be apparent during the course of the following description.

Figure 4:
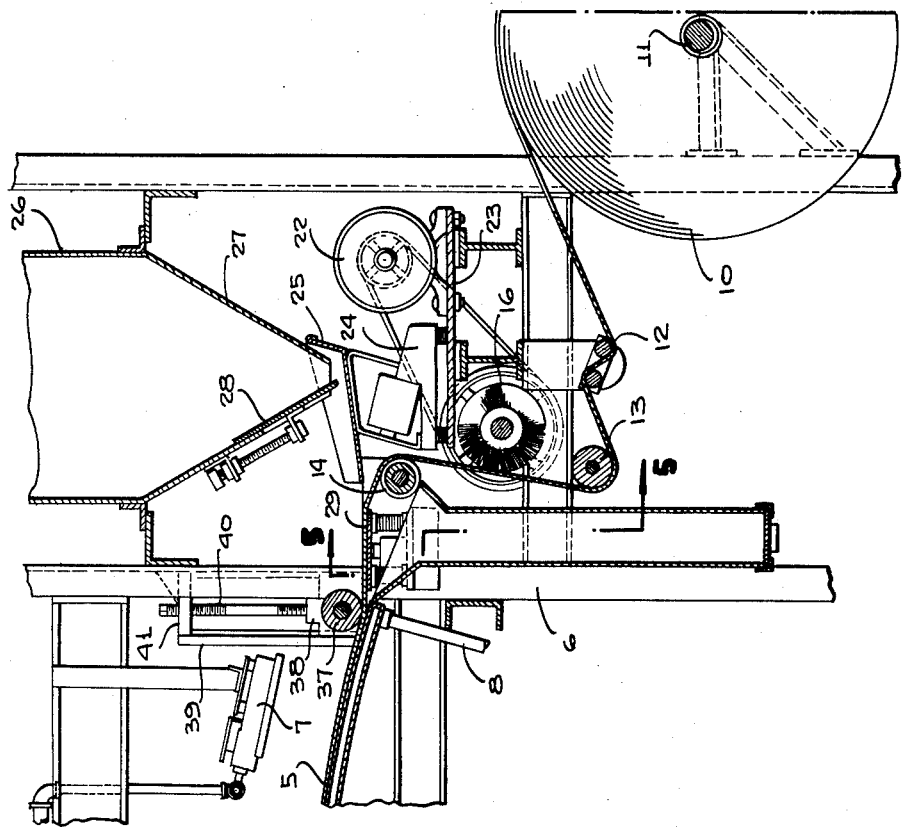
Figure 3:
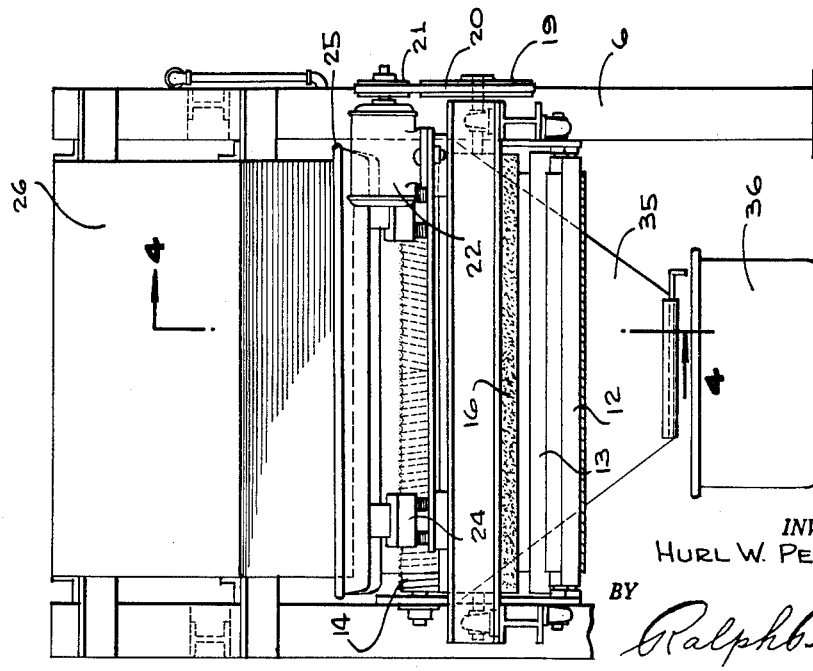

In the accompanying drawings, forming a part of this specification and in which like numerals are employed to designate like parts throughout the same, FIG. 1 is a diagrammatic side elevation view of the apparatus showing the improvements, FIG. 2 is a detail top plan view of the vibrating unit and associated parts of the machine, FIG. 3 is an end view of the apparatus looking towards the brushing and vibrating units, FIG. 4 is a sectional view taken on line 4—4 of FIG. 3, FIG. 5 is a sectional view taken on lines 5—5 of FIG. 4, FIG. 6 is a detail side view of the control means for the vibrator unit, and, FIG. 7 is a view taken on the line 7—7 of FIG. 6.

In the drawings, the numeral 5 denotes an elongated platen, longitudinally curved or arched, which is supported in a frame 6 beneath a series of infra-red gas radiant heaters 7. The platen 5 is of hollow construction to receive a cooling medium supplied by pipe 8 at one end and having a discharge pipe 9 at the opposite end providing a continuous flow of the cooling medium through the chamber of the platen. A roll of carpet 10 to be processed is mounted at 11 in spaced relation to the forward end of the platen. The carpet passes from the roll between tension bars 12 and then beneath an idler roll 13 before passing over a spreader roll 14 having a ribbed surface 15, for spreading the carpet in a weftwise direction. A rotary brush 16 is mounted between the idler roll 13 and spreader roll 14 with its surface in light contact with the backing of the carpet. The shaft 17 of the brush has its ends rotatably mounted in bearings 18 and on one end of the shaft is mounted a pulley 19 driven by a belt 20 which in turn is driven by a pulley 21 mounted on the shaft of a motor 22.

The motor 22 is mounted on a platform 23 above the brush 16 which also supports a metering device 24 for actuating a feed chute 25 to control the amount of thermoplastic powder, such as polyethylene or other suitable thermoplastic material, distributed onto the backing of the carpet. A hopper 26 for holding the supply of thermoplastic powder is mounted above the chute 25 having a discharge spout 27 with an adjustable gate 28 for controlling the flow of powder to the feed chute. An electrical vibrator unit 29 is mounted on the frame 6 forward of the discharge end of the feed chute 25 which consists of a plate 30 over which the carpet passes after leaving the spreader roll 14. The ends of the plate 30 are supported by coil springs 31 and a reciprocating solenoid 32 disposed beneath the ends of the plate imparts a vertical vibration to the plate when energized by the closing of a micro-switch 33 connected by wires 34 to a source of electric current. The vibrator unit shakes the carpet after the thermoplastic powder is deposited on the backing and thus produces a more even distribution of the powder over the backing. The surplus of powder deposited on the carpet is deposited into the over feed pipe 35 and is received in a container 36 beneath the pipe.

After the carpet leaves the vibrator unit it passes beneath the roller 37 having a polished surface which is adjustably mounted for light contact with the layer of powder deposited on the backing to compress the powder onto the backing. The roller 37 at each end is mounted in a bearing block 38 slidably mounted in a frame 39 for vertical movement. A screw shaft 40 extending upwardly from each bearing block is threaded in the top 41 of the frame and upon turning the shafts the bearing blocks may be vertically adjusted to control the pressure of the roller 37 on the backing of the carpet.

As the carpet passes over the platen 5 beneath the heaters 7, the layer of thermoplastic powder on the backing of the carpet is fused to form a soft sheet of plastic covering the backing. When the carpet leaves the platen it passes through a pressure and chill roll assembly 42 comprising a pair of spaced rolls 43 with a roll of smaller diameter 44 disposed between and above the rolls 43.

Mounted above the pressure roll assembly is a movable frame 45 for supporting a roll of scrim or other suitable backing fabric 46. The scrim fabric is trained between tension bars 47 and over a guide roll 48 before passing between a pressure roll 43 and the sheet of plastic covering the backing of the carpet. Thus, it is seen the scrim fabric is applied to the sheet of plastic while the plastic sheet is still soft and is pressed into the plastic by the pressure roll.

The carpet with the layer of scrim attached is then trained over a guide roll 49 and a drag roll 50 driven by a motor 51 through a sprocket chain 52. From the drag roll the carpet passes through a folding assembly 53 which folds the carpet for deposit on a receiving truck 54.

The micro-switch 33 for controlling the vibrator unit is mounted adjacent a cam wheel 55 mounted on the shaft of the drag roll 50 and is actuated by a pivoted cam lever 56 which is intermittently actuated by the spaced cam dogs or lugs 57 carried by the cam wheel.

In operation, as the drag roll 50 draws the carpet through the machine the micro-switch 33 is intermittently actuated to operate the vibrator unit 29 which shakes the carpet to evenly distribute the thermoplastic powder over the backing of the carpet before it passes over the platen 5 beneath the heaters 7. As the brush 16 removes all loose fibers and dirt from the backing of the carpet prior to the deposit of the powder on the backing the vibration of the carpet with the powder thereon not only causes an even distribution of the powder on the backing but causes the powder to fill the interstices of the woven backing. After the carpet leaves the vibrator unit the powder is pressed into the backing by the roller 37 which smooths the layer of powder before it is fused by the heaters. The fused powder forms a smooth even sheet of plastic on the backing before the layer of scrim 46 is applied to the plastic sheet. The process insures that the sheet of scrim will uniformly adhere to the sheet of plastic and that the sheet of plastic will be of uniform thickness and firmly secured to the backing of the carpet.

Having thus described my invention, I claim:

1. The method of applying a plastic coating and sheet of open weave scrim to the woven backing of a carpet comprising the steps of spreading the backing in a weftwise direction to spread the interstices of the backing in a weftwise direction, distributing a thermoplastic powder over the spread backing, vibrating the backing with the powder thereon to cause the powder to impregnate the interstices of the backing, compressing the powder in the interstices of the backing, bending the carpet to spread the interstices of the backing in a warpwise direction while simultaneously melting the powder to form a continuous viscous coating adhering to the backing and then pressing a sheet of open weave scrim upon the coating while the coating is still viscous.

2. Apparatus for applying a plastic coating to the woven backing of carpet comprising an arched platen, means supporting a roll of carpet adjacent the forward end of said platen, a drag roll adjacent the rear end of said platen for drawing the carpet over the upper surface of said platen in a warpwise direction with the backing facing upwardly whereby the interstices of the backing are spread in a warpwise direction, a spreader roll at the forward end of said platen for spreading the carpet weftwise to spread the interstices of the backing in a weftwise direction, a feeder for distributing a thermoplastic powder over the spread backing of the carpet, a vibrating plate beneath said carpet between said spreader roll and the forward end of said platen, means for vibrating said plate to shake said carpet with the powder thereon to cause the powder to impregnate the spread interstices of the backing, means at the forward end of said platen for compressing the layer of powder into firm contact with the backing, and heaters above said platen for fusing the layer of powder on said backing to form a continuous viscous coating.

3. Apparatus for applying a plastic coating and sheet of scrim to the woven backing of carpet comprising an arched platen, means supporting a roll of carpet at the forward end of said platen, means at the rear end of said platen for drawing the carpet over the upper surface of said platent in a warpwise direction with the backing facing upwardly whereby the interstices of the backing are spread in a warpwise direction, a spreader roll at the forward end of said platen for spreading the carpet weftwise to spread the interstices of the backing in a weftwise direction, a feeder for distributing a thermoplastic powder over the spread backing of the carpet, means for vibrating the backing with the powder thereon to cause the powder to impregnate the spread interstices of the backing, heaters above said platen for fusing the layer of powder on said backing to form a continuous viscous coating, means for delivering a sheet of open weave scrim over the viscous coating as the carpet leaves the platen, and means for pressing the sheet of scrim into bonding engagement with the viscous coating.

4. Apparatus for applying a plastic coating and sheet of scrim to the woven backing of carpet comprising an arched platen, means supporting a roll of carpet at the forward end of said platen, a drag roll at the rear end of said platen for drawing the carpet over the upper surface of said platen in a warpwise direction with the backing facing upwardly whereby the interstices of the backing are spread in a warpwise direction, a spreader roll at the forward end of said platen for spreading the carpet weftwise to spread the interstices of the backing in a weftwise direction, a feeder for distributing a thermoplastic powder over the spread backing of the carpet, a rotary brush disposed beneath said spreader roll having contact with the backing of the carpet, means for rotating said brush, a vibrating plate beneath said carpet between said spreader roll and the forward end of said platen, means for vibrating said plate to shake said carpet with the powder thereon to cause the powder to impregnate the spread interstices of the backing, means at the forward end of the platen for pressing the layer of powder into firm contact with the backing, heaters above said platen for fusing the layer of powder on said backing to form a continuous viscous coating, a roll of open weave scrim supported above the rear end of said platen, means for pressing the scrim material into bonding engagement with the viscous coating, and means actuated by said drag roll for intermittently actuating said vibrating means.

References Cited in the file of this patent

UNITED STATES PATENTS

| | | |
|---|---|---|
| 1,035,266 | Taylor | Aug. 13, 1912 |
| 2,021,095 | Ball | Nov. 12, 1935 |
| 2,055,464 | Bowes | Sept. 29, 1936 |
| 2,351,265 | Hiers | June 13, 1944 |
| 2,434,111 | Hawley et al. | Jan. 6, 1948 |
| 2,641,296 | Marco | June 9, 1953 |

FOREIGN PATENTS

| | | |
|---|---|---|
| 765,344 | Great Britain | Jan. 9, 1957 |